United States Patent [19]

Morrison

[11] 4,364,512

[45] Dec. 21, 1982

[54] ZONE HEAT CONTROL

[76] Inventor: Thomas R. Morrison, 123 Overlook St., Mount Vernon, N.Y. 10052

[21] Appl. No.: 215,270

[22] Filed: Dec. 11, 1980

[51] Int. Cl.³ .................. F22B 35/00; F24D 3/00; F04B 49/00

[52] U.S. Cl. .................. 236/9 A; 236/25 R; 237/8 R; 417/12

[58] Field of Search .................. 236/9 A, 25 R, 22; 417/12, 43; 165/12, 22; 126/362; 237/8 R

[56] References Cited

U.S. PATENT DOCUMENTS

| | | | |
|---|---|---|---|
| 2,545,206 | 3/1951 | Main | 165/12 |
| 3,627,202 | 12/1971 | Meier | 236/25 R |
| 4,150,788 | 4/1979 | Matsumoto et al. | 165/12 |

*Primary Examiner*—Albert J. Makay
*Assistant Examiner*—Harry Tanner

*Attorney, Agent, or Firm*—Thomas R. Morrison

[57] ABSTRACT

Each heating zone in a structure includes a thermostat controlling a valve feeding one or more heat delivering devices in a heat controlled zone in a structure. A controller periodically attempts to flow a fluid through the control valves and a flow sensor determines whether or not the attempt is successful. If the attempt is unsuccessful, indicating that all control valves are closed, the controller terminates the attempt to flow fluid. If the attempt is successful, indicating that one or more of the control valves are opened by their respective thermostats, the controller provides the circulation of heated fluid therethrough which results in the delivery of heat into the temperature controlled zones. When the last temperature controlled zone has received sufficient heat to cause its control valve to turn off, the flow sensor, sensing this condition, produces a signal which causes the controller to discontinue the flow of fluid.

8 Claims, 2 Drawing Figures

4,364,512

ZONE HEAT CONTROL

BACKGROUND OF THE INVENTION

The present invention relates to heating systems and, more particularly, to zone temperature control of heating systems.

In large structures, it is desirable to be able to separately control the temperature of different zones. For example, it may be desirable to separately control the temperature of daytime-use areas such as, for example, bedroom spaces. In addition, in a multiple family dwelling, it may be desirable to permit individual control of the heat in separate apartments.

Thermostatically controlled valves on individual heat-radiating devices are known. It has been customary to employ individual thermostats in separate heating zones controlling valves feeding the heat radiating devices. When such thermostats are used, it has been necessary to run wires to the furnace controller to indicate to the furnace controller that heat is being called for by the thermostat. Such wiring represents a cost and installation problem.

OBJECTS AND SUMMARY OF THE INVENTION

Accordingly, it is an object of the present invention to provide a zone heat control system which permits individual control of heating zones without providing separate wiring from the heating zones to the furnace controller.

It is a further object of the invention to provide a time-phased test function to determine whether heating fluid is permitted to flow through one or more of heat radiating devices in the structure and, if no flow is detected, to terminate the attempt to flow heating fluid. Alternatively, if a flow is detected, the apparatus permits continued flow of heating fluid until a flow is no longer permitted.

According to an aspect of the invention there is provided a heating control system for a structure having at least first and second heated areas comprising a first heat delivering device in the first heated area, a second heat delivering device in the second heated area, a furnace, means for delivering heated fluid from the furnace to the first and second heat delivering devices, first means for controlling delivery of the heated fluid to the first heat delivering device in response to a first temperature in the first heated area, second means for controlling delivery of the heated fluid to the second heat delivering device in response to a second temperature in the second heated area, means for periodically attempting to flow a fluid through the first and second means for controlling delivery, means for sensing flow of the fluid to the first and second means for controlling delivery, and means for energizing the means for delivering when a predetermined flow of the fluid is sensed by the means for sensing flow.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
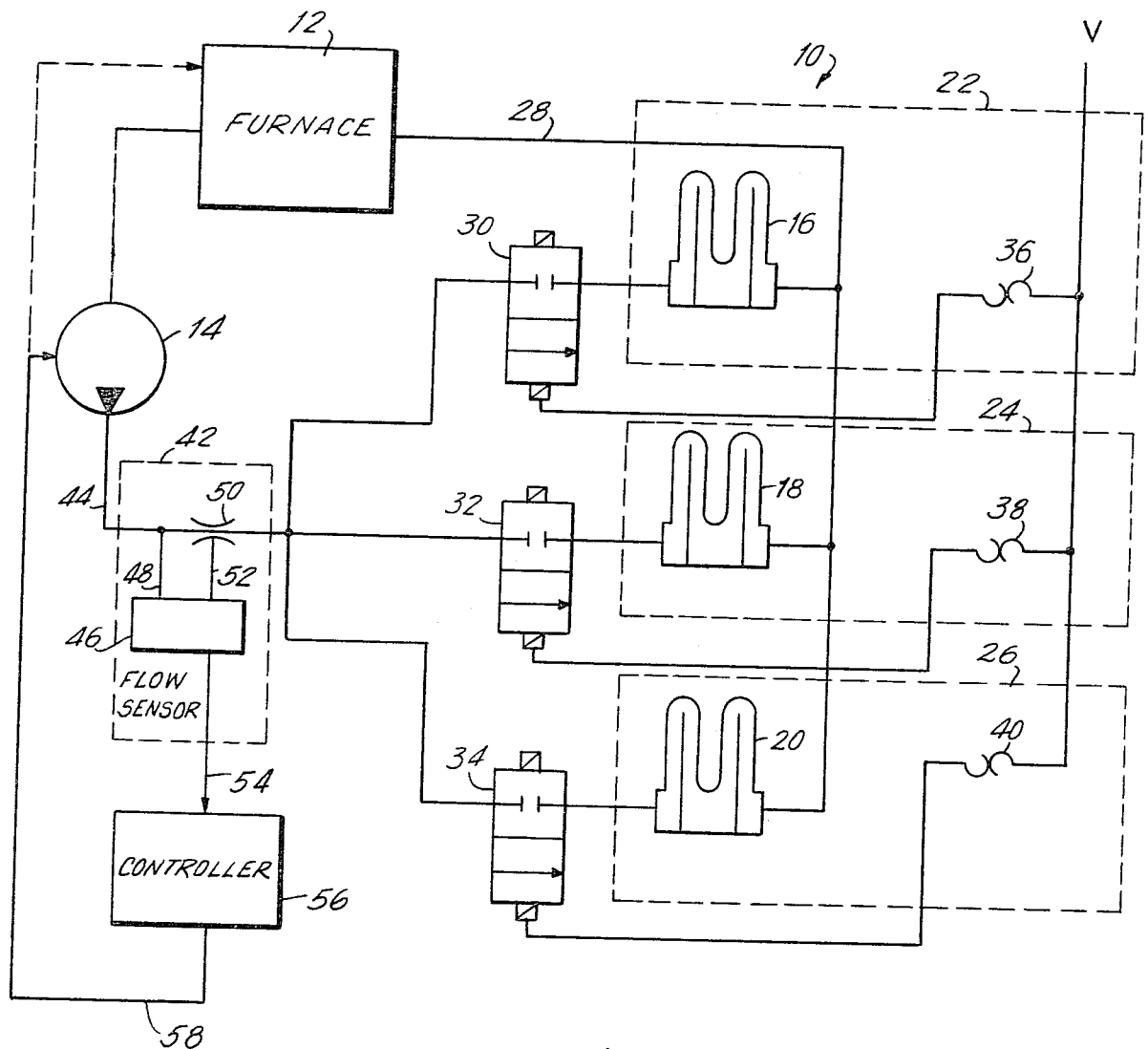
FIG. 1 is a schematic diagram of a zone heat control system according to an embodiment of the present invention.

Referring now to FIG. 1, there is shown, generally at 10, a zone heat control system. Although the present invention is applicable to all kinds of heating systems including hot air, hot water and steam, for concreteness of description, a hot water system is shown in FIG. 1.

A furnace 12 of any convenient type such as, for example, electric, coal, oil or gas fired is operative to heat a heating fluid, such as water passing therethrough. As is conventional, furnace 12 includes thermostatic controls (not shown) which turn on the burner thereof when the temperature of the fluid therein or passing therethrough falls below a predetermined point and turns off the burner when the fluid temperature exceeds a predetermined point.

Fluid is pumped from furnace 12 by a fluid circulator 14 through a plurality of radiators 16, 18 and 20.

Radiators 16, 18 and 20 are located in zoned heated areas 22, 24 and 26 respectively and feed return water to furnace 12 on a return line 28.

Thermostatically controlled valves 30, 32 and 34 are controlled by thermostats 36, 38 and 40 respectively according to the temperatures in their respective zoned heated areas 22, 24 and 26. Thermostatically controlled valves 30, 32 and 34 are illustrated as solenoid-controlled valves which are controllable by electrical thermostats 36, 38 and 40. Electrical control of thermostatically controlled valves 30, 32 and 34 is not a necessary part of the invention since mechanical, fluid mechanical or other means of actuation thereof according to temperatures in the respective zoned heated areas is equally within the contemplation of the present invention.

A flow sensor 42 of any convenient type is employed to determine whether fluid provided by fluid circulator 14 is actually circulating through one or more radiators 16, 18 and 20. Flow sensor 42 may be, for example, a pressure sensor which senses the absolute pressure on output line 44 of fluid circulator 14 or, alternatively, it may be a differential fluid pressure sensor which senses the difference in pressure between return line 28 and output line 44. However, in the preferred embodiment for a hot water system, flow sensor 42 includes a differential pressure sensor 46 which is fed fluid pressure from output line 44 via a line 48 and also fluid pressure from a venturi 50 in output line 44 by way of a line 52. As is well known, the pressure in the throat of a venturi is reduced as compared to the pressure of fluid in an input line thereto when fluid actually flows through the venturi. In the absence of fluid flow through the venturi 50, the pressure in lines 48 and 52 is substantially equal.

Differential pressure sensor 46 provides an electrical, mechanical or fluid signal on a line 54 to a controller 56. Controller 56 controls the operation of fluid circulator 14 by way of a signal on a control line 58.

Controller 56 contains timing apparatus of conventional types which periodically energize fluid circulator 14 for purposes of sensing whether heat is being called for by one or more of thermostats 36, 38 and 40. Fluid circulator 14 thereupon begins pumping fluid. If thermostatically controlled valves 30, 32 and 34 are all in the closed condition shown, indicating that none of thermostats 36, 38 and 40 is demanding heat, flow sensor 42 detects the absence of flow therethrough and this information coupled to controller 56 on line 54 causes controller 56 to deenergize fluid circulator 14 after a short time. Alternatively, if one or more of thermostatically controlled valves 30, 32 and 34 is in the open condition, the flow of fluid through flow sensor 42 is communicated to controller 56 which thereupon maintains an energizing signal to fluid circulator 14 whereby circulation of fluid to one or more of radiators 16, 18 and 20 is continued until the last one of thermostats 36, 38 and 40 ceases demanding heat and closes its respective thermostatically controlled valves 30, 32 and 34. Flow sensor 42, thereupon sensing a lack of flow therethrough, causes controller 56 to deenergize fluid circulator 14 and to thus halt the heating operation.

During the intervening non-heating periods, controller 56 periodically energizes fluid circulator 14 to test for a demand for heat from one or more of zoned-heated areas 22, 24 and 26. When a new demand for heat is sensed by flow of fluid in flow sensor 42, the heating sequence is repeated.

Differential pressure sensor 46 may be of any convenient type. For example, differential pressure sensor 46 may include first and second chambers separated by a diaphragm with lines 48 and 52 entering separate ones of the first and second chambers. An electrical switch or mechanical output may be obtained from motion of the diaphragm when differential pressure is sensed.

Figure 2:
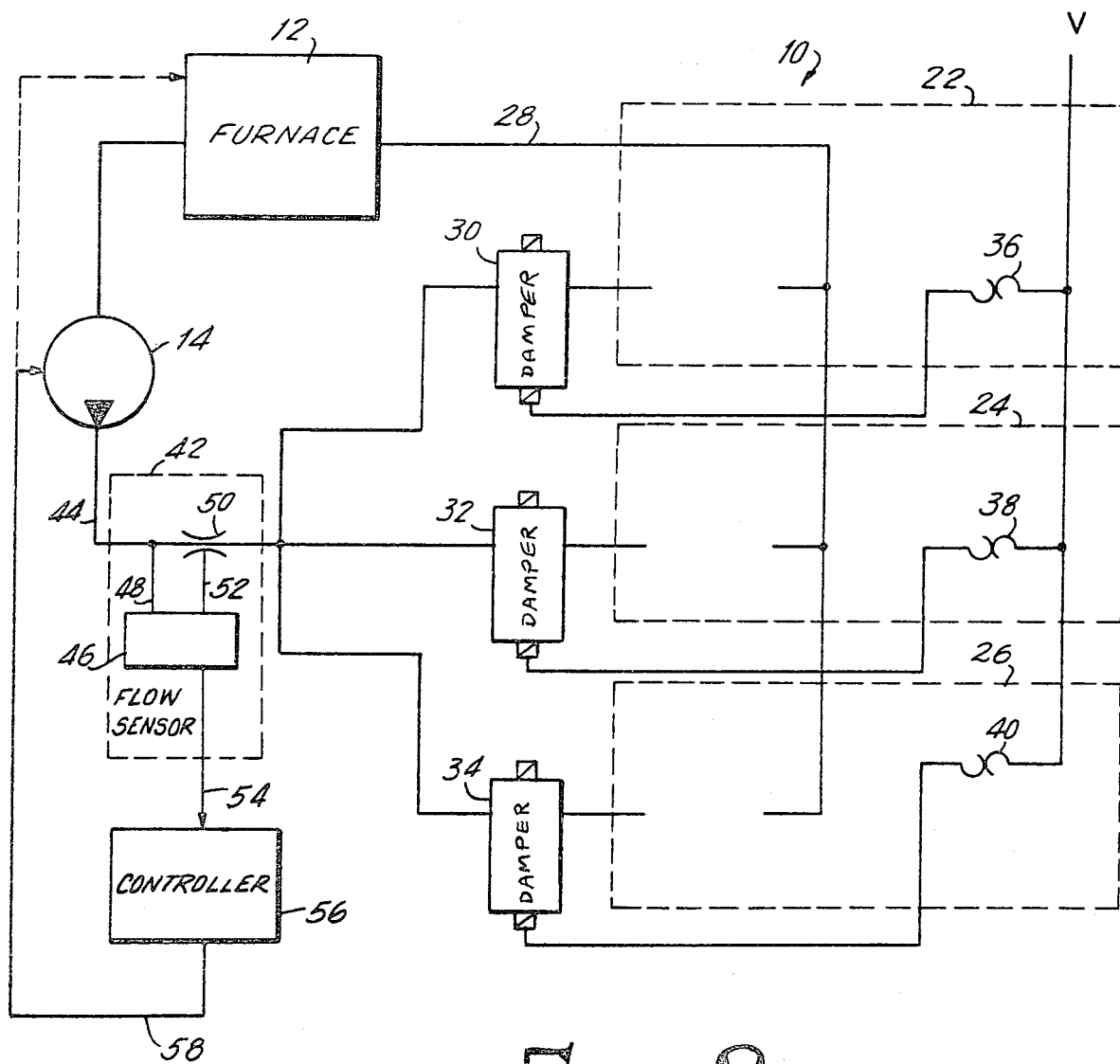
FIG. 2 is a schematic diagram of a zone heat control system according to an embodiment of the present invention adapted to a hot air heating system.

Referring now to FIG. 2, there is shown a hot air system wherein radiators 16, 18 and 20 and thermostatically controlled valves 30, 32 and 34 of FIG. 1 are replaced by thermostatically controlled dampers for controlling the flow of heated air directly into to zoned heated areas 22, 24 and 26. Return 28 is a conventional cold air return. In such a system, element 14 is known as a blower. In addition, flow sensor 42 may be a simple air pressure sensor in output line 44. When all of the dampers are closed, indicating that no demand for heat exists in any of zoned heated areas 22, 24 and 26, the air pressure sensed in flow sensor 42 attains a higher value than when one or more of the dampers is open. A pressure threshold is thus employed to provide a signal on line 54 to controller 56.

A system similar to that in FIG. 1 is applicable to a steam heating plant. However, if the steam system is one in which quiescent periods of the heating system result in the absence of pressurization of the lines, fluid circulator 14 may be replaced by an air pump which periodically attempts to pressurize output line 44. If this attempt to pressurize the lines is unsuccessful, it indicates that one or more of thermostatically controlled valves 30, 32 and 34 is open, and thus demanding heat. Controller 56 thereupon acts directly on furnace 12 to energize the steam generating apparatus therein as indicated by a dashed line 60. Controller 56 must, of course, maintain the energization of furnace 12 for a long enough period for steam to be generated and for the pressure in output line 44 to be stabilized by the presence of steam. When the pressure in output line 44 exceeds a predetermined value, or when the flow through flow sensor 42 decreases below a predetermined value (after steam is generated), controller 56 is enabled to deenergize furnace 12 and halt the steam generating process.

Having described specific embodiments of the invention with respect to the accompanying drawing, it is to be understood that the invention is not limited to this precise embodiment, and that various changes and modifications may be effected therein by one skilled in the art without departing from the scope or spirit of the invention as defined in the appended claims.

What is claimed is:

1. A heating control system for a structure having at least first and second heated areas comprising:
   a first heat delivering device in said first heated area;
   a second heat delivering device in said second heated area;
   a furnace;
   means for delivering heated fluid from said furnace to said first and second heat delivering devices;
   first means for controlling delivery of said heated fluid to said first heat delivering device in response to a first temperature in said first heated area, said first means for controlling delivery having an open, condition in response to said first temperature being below a first predetermined value and a closed condition in response to said first temperature being above said first predetermined value;
   second means for controlling delivery of said heated fluid to said second heat delivering device in response to a second temperature in said second heated area, said second means for controlling delivery having an open condition in response to said second temperature being below a second predetermined value and a closed condition in response to said second temperature being above said second predetermined value;
   means for periodically attempting to flow a fluid through said first and second means for controlling delivery;
   means for sensing flow of said fluid to said first and second means for controlling delivery; and
   means for energizing said means for delivering and said furnace as long as a predetermined flow of said heated fluid, indicative of at least one of said first and second means for controlling delivery being in its open condition, is sensed by said means for sensing flow.

2. A heating control system according to claim 1, wherein said furnace is a hot water furnace, said first and second heat delivering devices include radiators and said first, second means for controlling include thermostatically controlled solenoid valve, and said fluid includes hot water from said furnace.

3. A heating control system according to claim 1, wherein said furnace is a hot air furnace and said fluid is air.

4. A heating control system according to claim 1, wherein said furnace is a steam furnace.

5. A heating control system according to claim 1, wherein said means for sensing flow includes a pressure sensor.

6. A heating control system according to claim 1, wherein said means for sensing flow includes a differential pressure sensor.

7. A heating control system according to claim 6, wherein said means for sensing flow includes a venturi through which said fluid passes having an output connected to a first input of said differential pressure sensor.

8. A heating control system for a structure having at least one heated area comprising:
   a heat delivering device in said heated area;

a furnace;

means for delivering heated fluid from said furnace to said heat delivering device;

means for controlling delivery of said heated fluid to said heat delivering device in response to a temperature in said heated area, said means for controlling delivery having an open condition in response to said temperature being below a predetermined valve and a closed condition in response to said temperature being above said predetermined value;

means for periodically attempting to flow a fluid through said means for controlling delivery;

means for sensing flow of said fluid to said means for controlling delivery; and means for energizing said means for delivering and said furnace as long as a predetermined flow of said heated fluid, indicative of said means for controlling delivery being in its open condition, is sensed by said means for sensing flow.

* * * * *